Nov. 18, 1958  H. G. SWIFT, JR  2,860,562
SHIFT BAR
Filed Feb. 9, 1954  3 Sheets-Sheet 1
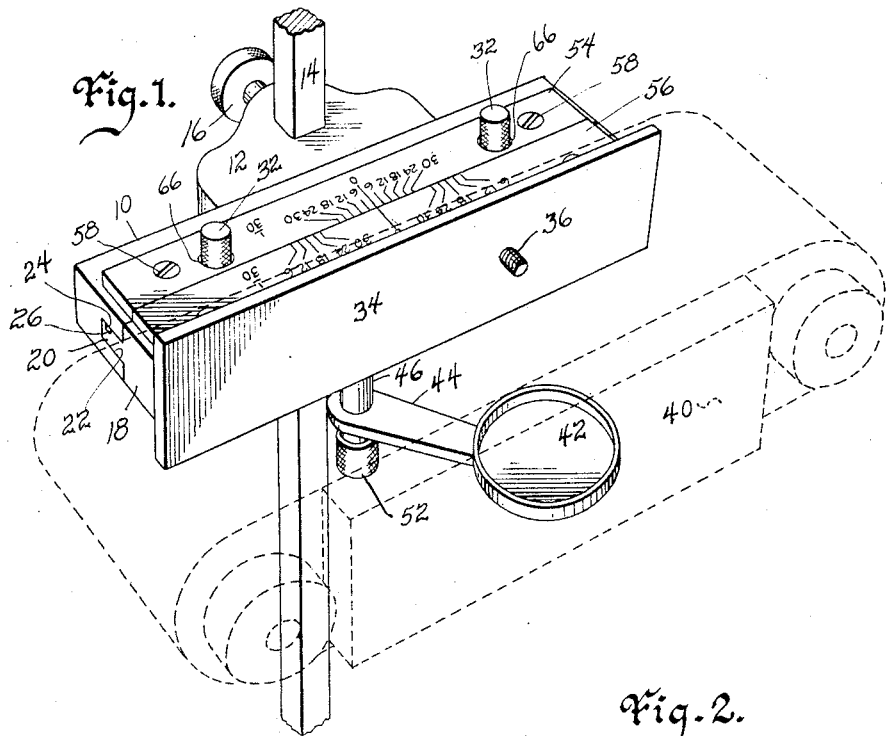
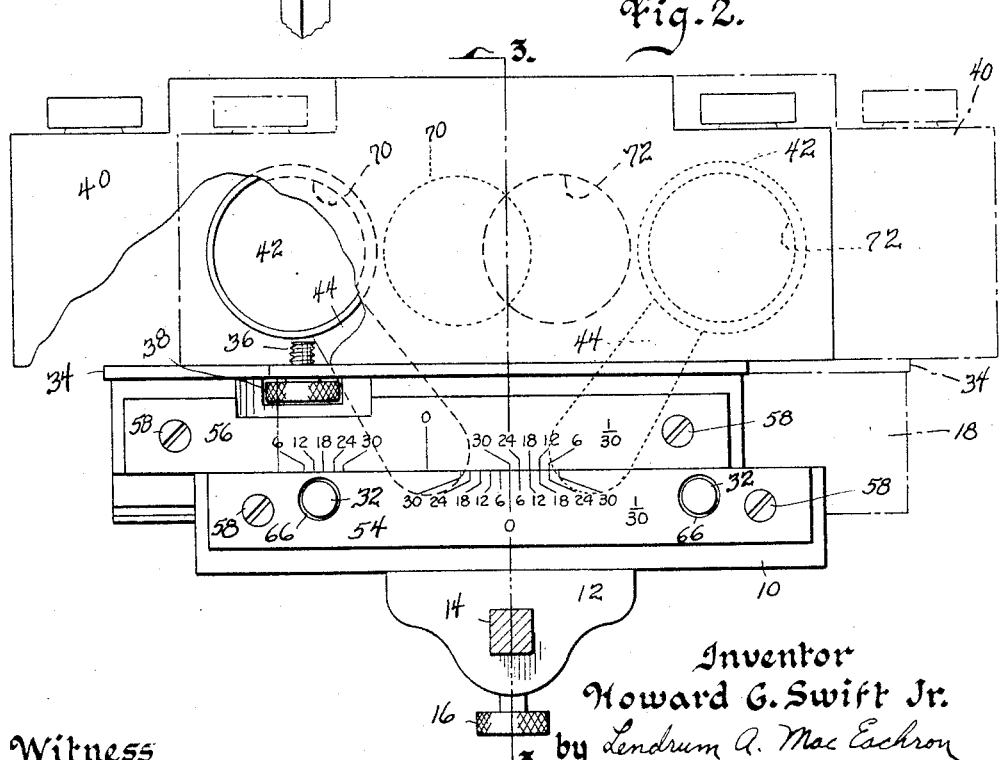
Inventor
Howard G. Swift Jr.
by Lendrum A. MacEachron
Attorney
Witness
Edward P. Seeley

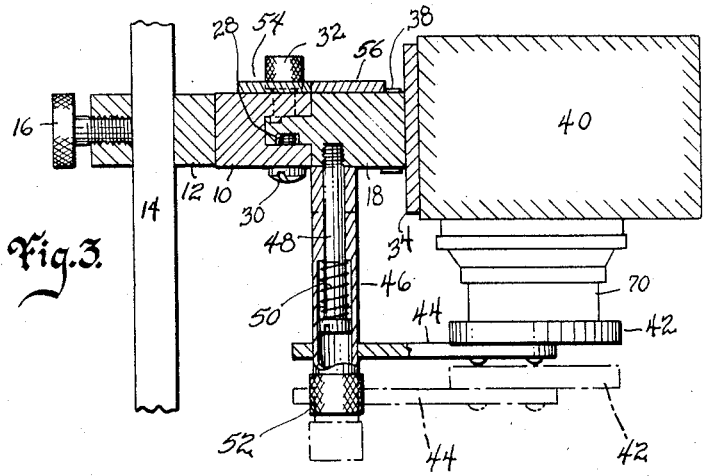
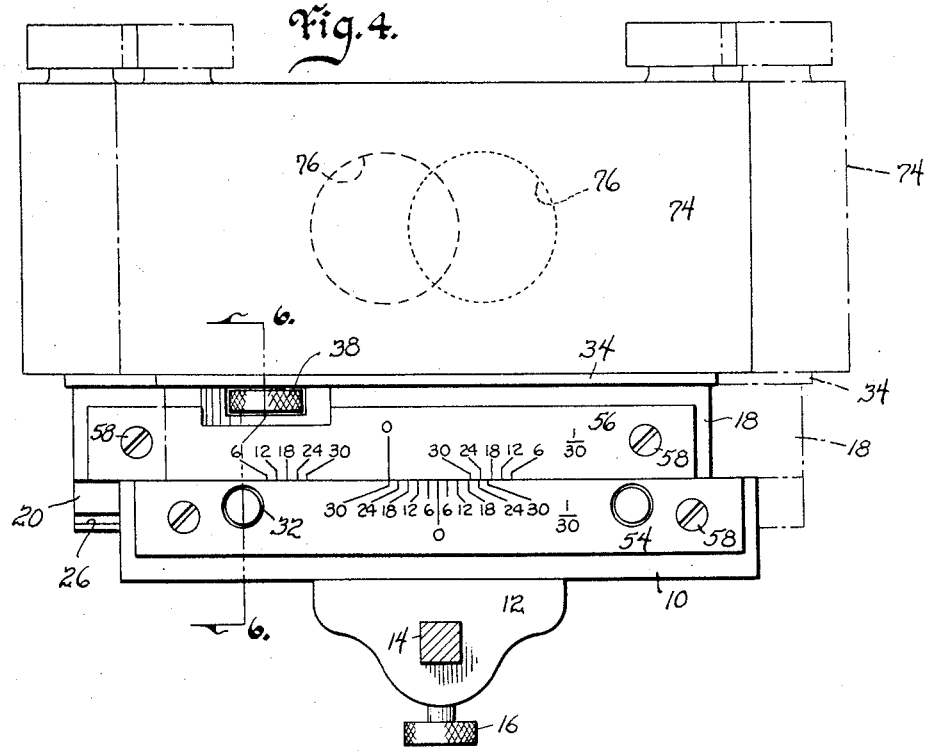

Nov. 18, 1958     H. G. SWIFT, JR     2,860,562
SHIFT BAR
Filed Feb. 9, 1954     3 Sheets-Sheet 3
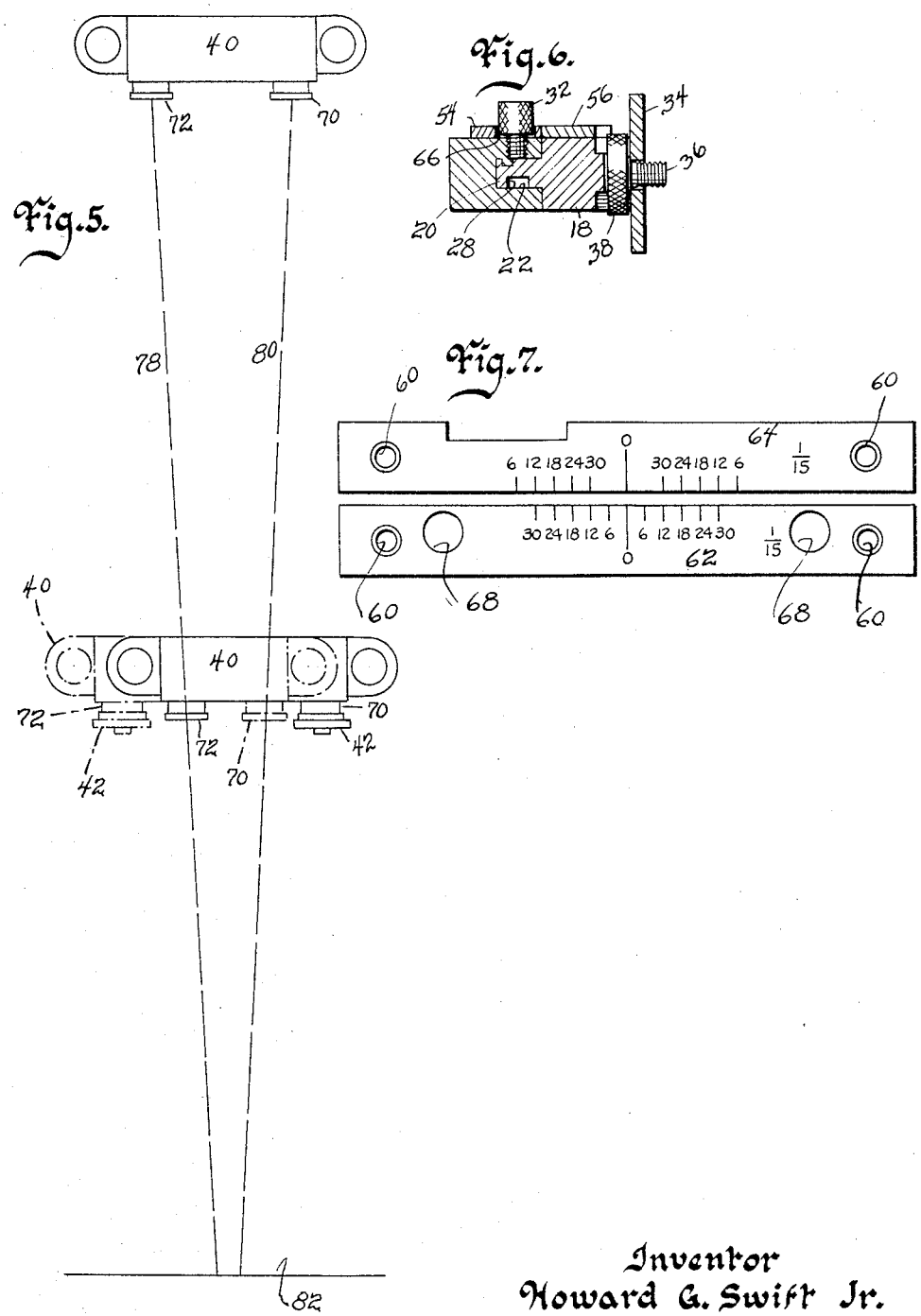
Inventor
Howard G. Swift Jr.
by Lendrum A. Mac Eachron
Attorney
Witness
Edward P. Seeley United States Patent Office 2,860,562
Patented Nov. 18, 1958

2,860,562

SHIFT BAR

Howard G. Swift, Jr., Des Moines, Iowa

Application February 9, 1954, Serial No. 409,060

5 Claims. (Cl. 95—86)

My invention is a shift bar for taking stereoscopic pictures at close range generally referred to in the art merely as stereo close-ups. It consists of two elements relatively slidable with respect to each other. One of these elements is provided with means for securing a camera to it, and the other carries a means for securing it to a stable support of any suitable nature. The two relatively movable elements are graduated with scales that have significance only in the taking of stereoscopic close-ups. The scales are marked on separate pieces of material that are removably secured to the movable elements which permits the use of different scales with one shift bar. The use of different scales causes the pictures taken to have more or less "depth." The scales are graduated and marked in such a manner that the person using the device need determine only the distance between the object being photographed and the camera and move the slidable element to which the camera is secured until a graduation bearing the number representing the previously determined distance between the camera and the subject is aligned with a centered reference mark.

Stereoscopic pictures, or pictures with the appearance of depth are well known. Recently the use of so called "3D" pictures has been widely publicized, and cameras for taking stereoscopic pictures are available to the public. These cameras are provided with lenses of a fixed lens separation. It has been discovered that a fixed lens separation is entirely practical for a wide range of distances between the subject and the camera. For distances between the subject and the camera of less than three and one-half feet, the usual fixed inter-lens distance stereoscopic camera has been found to produce pictures having an excessive indication of depth. The excessive depth appearance is not good and in extreme cases even gives an entirely erroneous impression of the true spatial relationships between objects that appear in the pictures. It has been found that people studying these too deep stereoscopic pictures have experienced eye strain which in extreme cases leads to headaches, nausea and other more generalized symptoms. In cases involving very close work, the usual fixed lens stereoscopic camera actually misses some of the subject with one or both of its lenses. Obviously the usual stereoscopic camera has some serious shortcomings in regard to taking close-up pictures that have an appearance of depth.

Stereoscopic cameras that are to take close-ups which avoid the difficulties listed above must be provided with lenses that are closer together than are the lenses of the usual stereoscopic camera. There have been attempts made to produce cameras with lenses that are movable sidewise in order to make stereoscopic close-ups that are not too deep. Such cameras have not met with notable commerical success to my knowledge, and it is my belief that the reason for this commercial failure is that these cameras with laterally movable lenses are a mechanism very intricate and difficult to manufacture. Furthermore, theer is a definite limit to the closeness of the close-up shots that can be taken with such a camera in any event. It is obvious that the lenses even if movable sidewise, cannot be moved closer together than to positions immediately adjacent to each other. Lens separation, however, is measured from the centers of the respective lenses. Even when the two lenses are next to each other, therefore, the inter-lens distance may be as much as 30 millimeters (millimeters hereafter being abbreviated mm.) while the correct inter-lens distance should be only 20 or 25 mm., perhaps, at a camera to subject distance of as much as 30 inches. Obviously there are limitations on the use of the laterally movable lens stereoscopic camera even if it could be constructed inexpensively enough to make it available to most photographers who might want to make such close-up photographs. It would be possible to make a foreshortened and fixed inter-lens distance camera, but its shortcomings are with one exception too obvious to mention. Among other difficulties that would be encountered with such a structure would be the very limited range of camera to subject distances that such a camera would be useful for. The stereoscopic effect is lost very rapidly if a camera with a relatively short inter-lens distance is used to take pictures at any but rather short ranges. Such a camera would also preserve all the difficulties of the movable lens camera except the item of expense in manufacturing. It appears, therefore, that shift bars are about the only possible method of taking close-ups with the stereoscopic effect at really short range and the only economically sound method of taking stereoscopic close-ups at all.

Since a shift bar must be used any way for certain pictures, it would seem that one which is easy to use would have been devised a long time ago. Instead, however, the subject of stereoscopic close-ups has not been very widely known. The shift bars before my invention are rather crude affairs as far as ease of use is concerned. In the past the knowledge available about taking stereoscopic close-ups has been in the form of rules or the like that are readily understandable, but ones that are not easily translated into actual use. These rules have usually been in the form of statements that the inter-lens lineal distance should be a certain fraction of the camera to subject distance. The size of this fraction would depend on the type of an affect that the promulgator of the particular rule wished to have considered the most desirable. These rules are not easily applied in a practical situation, however, because the inter-lens distance in stereoscopic cameras is measured in mm. while the usual measuring device that the photographer would use to measure subject to camera distance is graduated in inches. Furthermore, the amount of movement imparted to the shift bar when correcting the inter-lens distance of a stereoscopic camera for close-up work is not the inter-lens distance as determined by applying the rule to the camera to subject distance, but instead is the remainder found by subtracting the correct inter-lens distance from the fixed inter-lens distance of the stereoscopic camera being used. When the single lens camera is used, of course, the movement given to the shift bar is merely that determined to be the correct inter-lens distance for the particular closeup being taken. In each case the result is accomplished by taking separate pictures with the camera in different positions for each of the two pictures. The shift bars known to me are merely provided with graduations on one portion of the shift bar and a reference mark on another portion of the shift bar. It is clear that confusion could develop as to just how far and which direction the shift bar should be moved. In the case of the stereoscopic camera it is also necessary to cover the lens with which it is desired not to take a picture at any given time. In the past reliance has been placed on a conventional lens cover to do this job. It has proved unsatisfactory in that it is rather difficult to get on and off. Furthermore, since it relies on friction to hold it in place on the lens, it must fit rather snugly. Consequently in the process of getting the lens cover on the lens of the camera that is not to take a picture at a given time, the camera is moved other than in the manner necessary for the taking of the stereoscopic pictures. The known shift bars not only provide opportunity for error in the shifting of the bar, therefore, but also are relatively difficult and time consuming to use.

With all of the difficulties of the prior art in mind as set out above, the objects of my invention are to provide a shift bar that:

(1) Can be used with either stereoscopic or single element, i. e. lens, cameras with little or no likelihood of error in shifting the camera for a particular close-up.

(2) Can be used effectively by those having little or no knowledge of the theory of making stereoscopic close-ups.

(3) Can be altered to produce different affects in the pictures that are taken.

(4) Can be used to produce stereoscopic close-ups to within even a few inches of the subject without exaggerated depth appearance.

(5) The use of which is readily grasped with a minimum of instruction and practice.

(6) Minimizes the likelihood of disturbing the camera position other than sidewise between the taking of the two pictures necessary to make stereoscopic close-ups.

(7) Is economical to construct and sell. While the foregoing are the major objects of my invention, it is my intention to include also as objects of my invention any such objects not specifically listed here as may become apparent from a study of this specification, including the claims, and the accompanying drawings which are briefly described as follows:

Fig. 1 of the drawings is a perspective view of my shift bar and a fragmentary portion of a stand that could be used with the bar in taking stereoscopic close-ups. A camera is illustrated with broken lines.

Fig. 2 is a plan view of my shift bar with the bar shown in a shifted position and having a camera shown in light lines. Broken lines illustrate the lenses and hidden portions of the lens cover. A portion of the camera is broken away to show the lens cover in part. A shifted position of the bar is illustrated with dot-dash lines while dotted lines are used to illustrate the position of the lenses and the lens cover in this shifted position.

Fig. 3 is a vertical sectional view of the shift bar and a fragment of the support therefor taken on the line 3—3 of Fig. 2.

Fig. 4 is an identical view to that shown in Fig. 2 except that the camera shown is a single lens camera and the shift bar is shown shifted appropriately for a single lens camera and the lens cover is omitted as it is not used in this case.

Fig. 5 is a reduced diagrammatic view of what I accomplish through the use of my shift bar.

Fig. 6 is a vertical sectional view of my shift bar taken on the line 6—6 of Fig. 4.

Fig. 7 is a plan view of a different set of scales that can be used with the shift bar.

Referring to the drawings I have used the number 10 to designate the stationary member of the shift bar which is secured to the bearing block 12 in any suitable manner. The bearing block is vertically slidable (or horizontally slidable as the case may be) to and from the area in which the subject to be photographed is to be placed. The post which carries the bearing block and hole in the bearing block affording the sliding connection between them are preferably formed so as to avoid any substantial movement between them except the sliding motion described. The relative positions of the block and the post can be made stable by tightening the thumb screw 16. A movable member of the shift bar is designated 18 and is provided with some means that has a complementary portion on the stationary portion 10 of the shift bar to hold the two in close proximity even when they move slidably relative to each other. The particular structure that I illustrate here as a satisfactory method of slidably holding the two portions of the shift bar in alignment with each other is a tongue 20 on the member 18 that fits into an appropriate groove 22 in the member 10. A secondary tongue 24 extends into an appropriate groove 26 in tongue 20. These two grooves and tongues permit relative sliding movement between the two members but limit motion therebetween to such sliding motion. A second groove or channel designated 28 is formed in the bottom of tongue 20. This channel 28 stops short of both ends of the tongue 20 and a screw 30 extends through the member 10 and into this channel. When the screw 30 is in place extending into the channel 28, it is impossible to separate the two main portions 10 and 18 of the shift bar even by using the sliding movement permitted by the tongue and groove arrangement. The relative sliding movement of the two main members 10 and 18 can be limited by clamping the two members with the thumb screws 32. In some positions of the bars such as that shown in Fig. 4, for example, either or both of the screws can be used to lock the two members relative to each other. Sometimes, however, when it becomes necessary to shift the bar to a considerable extent, only one of the clamping screws will engage a portion of the tongue 20 when screwed down. The member 18 is the support for the camera plate 34 which carries a camera mounting bolt 36 that is provided with the usual knurled knob 38. The camera mounting structure described is one that is well known. By means of this structure, any suitable camera such as the one shown in broken lines and designated 40 in Fig. 1 can be secured to the member 18. Also secured to the member 18 so that it moves with the camera is the lens cover 42. The cover itself is secured to the arm 44 which may be either formed integrally or fixedly secured to the tube 46. The bore of the tube is reduced for a considerable portion of its length and slidably and pivotally embraces a cap screw 48. The cap screw is threaded into the member 18. A spring 50 is interposed between the head of the cap screw and the inner end of the larger bore of the tube 46. At the outer end of the tube 46 is the knurled knob 52 which provides a means for manipulating the lens cover. The spring 50 is a rather light tensioned one as is suggested by the thinness of it in Fig. 3. It need apply only a rather light pressure on the cover to draw it against the lens in a manner that will be entirely satisfactory to exclude light from one lens of a stereoscopic camera while a picture is being taken with the other lens. As disclosed by the dot-dash lines in Fig. 3, therefore, it is a simple matter to pull the tube down or away from the element 18 and therefore a camera secured to it, the spring 50 being compressed as this motion of the tube 46 takes place. When the tube is thus drawn down, the cover 42 clears the lenses of a camera mounted on the bar, and it can be swung as shown in Fig. 2 to cover the lens that is not to be used in taking a picture.

On the upper face of the members 10 and 18 are the scales designated 54 and 56 respectively. Scale 54 is the scale for use with a single lens camera and scale 56 is used with stereoscopic cameras. Both of the scales are secured to their respective members by means that tend to position them accurately on the members 10 and 18. The means I have elected to show are the flat headed screws 58. These flat headed screws fit into tapered or counter-sunk holes such as the ones shown in Fig. 7 and designated 60 in the scales 62 and 64. The tightening of the screws in the holes automatically positions the scales on the members correctly. The scales 54 and 56 are provided with the same type of screw holes. It is pointed out that the scales shown in Fig. 7 carry the designation $\frac{1}{15}$ while the scales 54 and 56 are marked $\frac{1}{30}$. These fractional designations on the scales indicated the fraction of the camera to subject distance the shift bar will provide if used with these scales. It is obvious that many other scales could be provided for use with the shift bar that would permit other and different degrees of apparent depth in the pictures made with them. If the scales 54 and 56 are used, therefore, the lenses of the camera will be spaced from each other 1/30 of the distance between the camera and the subject and 1/15 if scales 62 and 64 are used. All of the scales that fit on the element 10 are provided with openings such as those designated 66 on scales 54 and those designated 68 at Fig. 7. These openings permit the scales to fit over the knurled knobs 32. Thus the scales can be substituted for each other with relative ease by merely removing the screws 58 and exchanging the scales.

The scales themselves are graduated symmetrically on each side of a centered zero mark. It will be noted that the scales for use with stereoscopic cameras, scales 56 and 64, have the largest numbers designating graduations nearest to the zero mark while the scales 54 and 62 have the smallest numbers nearest to the zero and the largest numbers spaced out farthest. In other words the two scales have their numbers in reverse order with respect to each other. The numbers used on the scales are selected somewhat arbitrarily as being the numbers of close-up distances measured in inches that will find rather general use. The actual location of the calibration is determined in the following manner. Having selected the numbers 6, 12, 18, 24 and 30 as close-up distances measured in inches, we then determine what the actual lens separation should be for each of the various distances when a particular fraction of the camera-subject distance is used. In the case of the 30 inch distance from camera to subject, the inter-lens distance on the scales 54 and 56 is 1 inch. It is easy to set up the scales 54 and 62 since this inter-lens distance is merely divided by two and laid off on each side of zero. When the scales for use with stereoscopic cameras are being laid out, however, the problem is a little more complicated. In the first place the inter-lens distance of the usual stereoscopic camera is in terms of mm. Furthermore, the graduations on the scale are spaced in terms of the difference between the distance desired as an inter-lens distance and the inter-lens distance built into the camera. This distance was taken originally from figures on the average distance between the eyes of a human being, as modified by the sprocket hole spacing on standard film. Although the average spacing of human eyes is in the 65 mm. range someplace, therefore, the usual camera actually uses an inter-lens distance of 70 mm. There are some cameras that do not use the 70 mm. distance, but they are the exception. In making the scales 56 and 64, therefore, it is necessary to both translate the inch measurements into mm. and then find the difference between this translated figure and the built-in inter-lens distance of the particular camera with which the shift bar is to be used. Actually most of the stereoscopic cameras being manufactured have very similar if not actually identical inter-lens distances. The graduations thus laid out on the scales are designated with numbers that correspond to the camera to subject distance for which they are the proper corrective. Thus the scales can be read directly in terms of the camera to subject distance without the need to do any arithmetical calculations before shifting the bar. It can be seen from a comparison of Figs. 2 and 4 that the actual inter-lens distance between the lenses when the single and stereoscopic cameras are used to take pictures at the same distance from the subject is the same. It will also be seen, however, that the amount of movement imparted to the shift bar elements is much greater in the case of the stereoscopic camera than in the case of the single lens camera. The process described above is repeated for each camera to subject distance that is desired and for as many different fractions of the distances as are desired. Numerous scales may be made to be available to photographers to produce any type of stereoscopic close-up that he may desire to make. Obviously he need have no special knowledge about making stereoscopic close-ups nor any special ability and training in arithmetic to use the device quickly and efficiently with little or no chance of error.

While the camera in Fig. 2 has been designated 40, the lenses of this camera have not been assigned reference numbers so far. It will be considerably easier to keep the various positions of the two lenses separate if they are assigned separate numbers, however. The left hand lens in Fig. 2 is, therefore, given the designation 70 while the right hand lens is designated 72. The single lens camera shown in Fig. 4 is designated 74, and its lens 76.

Referring now particularly to Figs. 2, 3, 4 and 5; I will explain the use of my shift bar and the advantages that can be derived from its use. In Fig. 5 is shown the camera 40 at two different levels and in two positions at the lower level. The broken lines 78 and 80, extending down from each lens in the upper position through the same lenses in the lower position and to a surface designated 82 which represents the subject being photographed, may be said to represent the lens separation desired for stereoscopic pictures of a particular amount of depth appearance. It is not possible to say just what the desirable amount is without also specifying the use to which the pictures are to be put. In the case of certain uses to be made of the pictures taken, distortion is much more objectionable than in other cases. In art works for example the appearance of the subject as it is shown in the photograph is the only really important thing. Any distortion of the appearance of the subject matter would be utterly intolerable. In other cases it may well be desirable to have the emphasis placed on certain subject matter that is the result of the excessive depth achieved by having the inter-lens distance a little greater. When the amount of depth effect that is desired has been determined, it is a simple matter to select the proper scale, secure it to the shift bar and proceed to take pictures with little or no thought to the matter of lens separation thereafter. Although I speak here of reducing inter-lens distance, actually of course, we are only moving the lenses in relation to the subject being photographed. As shown in Fig. 5 furthermore, the lenses maintain a given relationship with respect to the distance they are from the subject. Of course, only one picture is taken at any one position of the camera refering now to lateral movement and the lens cover 42 is used to shut light away from the lens not being used. As long as the lenses are kept aligned with the inter-lens spacing lines 78 and 80, the appearance of depth in the close-ups will be that expected with the particular lens spacing and there will be no more eye strain than would be experienced at any other distance of the camera to subject. The actual use of the shift bar to maintain the desired inter-lens distance is as follows.

To make the use of the bar most clear, I am going to follow through the actually taken steps in using the shift bar with an imaginary stereoscopic close-up problem. Distances will be assumed to be of such values that the drawings will illustrate our particular problem accurately. I will assume, therefore, that the desired lens spacing is 1/30 of the camera-subject distance. The scales 54 and 56 are secured to the shift bar, therefore, as shown in Figs. 2 and 4. We then decide that the camera should be moved in to about 30 inches from the subject matter photographed which is done in the conventional manner. The camera must be focused for this distance, and diopter lenses must be used. These special lenses are no part of my invention, however, and I mention them merely in passing. The camera is now ready to take a picture except for the positioning of the lenses. As shown in Fig. 2 in solid lines, the shift bar is shifted to the left until the graduation numbered 30 on the right side of the scale 56 aligns with the zero on the scale 54. The lens cover 42 is placed over the lens 70 and a picture is taken with the lens 72. The camera is then moved to the position illustrated with the dot-dash lines and in which the lenses appear in dotted lines. This is done of course by unlocking the shift bar and shifting it to the right until the graduation numbered 30 on the left side of the scale 56 is aligned with the zero on the scale 54. Again a picture is taken and the stereoscopic picture is complete. The two lenses 70 and 72 were in the positions shown in broken lines for 72 and dotted lines for 70 when the pictures are taken. The lens 72 is covered, of course, when the lens 70 is being used.

The use of the shift bar for making stereoscopic close-ups but using the usual single lens camera is very similar in many ways to the use of the bar with the stereoscopic camera. As shown in Fig. 4, the camera has been moved to the left by shifting the bar element 18 until the zero on scale 56 is aligned with the graduation carrying the number 30 on the left sidde of the zero on scale 54 as viewed in Fig. 4. The lens 76 of the camera 74 is in the position shown by broken lines. A picture is then taken and the camera is readied for taking another picture by rolling the film. It is then necessary to move the camera in the other direction or to the right as shown in Fig. 4 until the graduation designated 30 on the right side of scale 54 is aligned with the zero center mark on scale 56. The lens of the camera will then be positioned as shown by the dotted lines in Fig. 4, and another picture is taken. The single lens in Fig. 4 is placed in two positions by the correct use of the shift bar that are identical to the positions of the two lenses of the stereoscopic camera in Fig. 2. Of course, the same problem was being solved, so it is not surprising to find the same solution as far as inter-lens distance is concerned. For other distances, the above procedures could be followed exactly by merely substituting the camera-subject distance number of the different problem for the number 30 used in our assumed problem.

I feel that the foregoing description and drawings make it very clear that I have invented a shift bar for taking stereoscopic close-up pictures that fulfills the objects of my invention. It is clear that the distortion that can result from taking stereoscopic pictures at too close a range with the inter-lens distance excessive can be avoided readily by using my shift bar. As can be seen in both Figs. 2 and 4, it is actually possible to "overlap" the lenses for close-up work. Since entirely different scales are used for single and stereoscopic cameras, the likelihood of confusing the correct movement for a single lens comera with that for stereoscopic cameras is minimized. Since the scales read directly in terms of the distance between the camera and the subject, it is clear that little or no knowledge of the theory of taking stereo close-ups is necessary for the person using this shift bar. It is also clear that little or no instruction would make the use of my shift bar understood by almost anyone. The lens cover is the element of my shift bar that minimizes the chance of disturbing the situs of the camera between shots when a stereoscopic camera is being used to take close-ups. Having illustratively shown and described the preferred form of my invention, I now define specifically what I believe to be my invention as follows:

I claim:

1. In a shift bar; a member adapted to be secured to a stable support; a second member slidably secured to said first mentioned member and having means for securing a camera to said second member; a threaded well in said second member; a tube having a bore of substantially greater diameter at one of its ends than at the other of its ends; a headed cap screw within said tube and engaging the threaded well of said second member; said cap screw having its head in the larger diameter bore and its shank in the smaller diameter bore of said tube; a spring embracing the shank of said cap screw and interposed between the head of said cap screw and the inside end of the larger bore of said tube; an arm secured to said tube; and a lens cover secured to said arm.

2. In a shift bar; a member adapted to be secured to a stable support; a second member slidably secured to said member; means on said second member for securing a camera to it; a headed rod secured to said second member; said headed rod extending from said second member in the direction of the object to be photographed; a cylindrical member pivotally and slidably mounted on said headed rod; a spring on said headed rod between its head and the end of said cylindrical member; an arm secured to said cylindrical member; and a lens cover secured to said arm.

3. In a shift bar; a member adapted to be secured to a stable support; a second member slidably secured to said member; means on said second member for securing a camera to it; a scale on said member; a second scale on said second member; a reference mark on each of said members; the largest numbers on one of said scales being nearest said reference marks and the smallest numbers on the other of said scales being nearest said reference marks; the distance between any two graduations bearing the same numbers on the scale of which the largest numbers are farthest from said reference marks being equal to a predetermined fraction of the lineal distance represented by the numbers of said scales; the distance between any two graduations bearing the same number on the scale on which the largest numbers are closest to said reference marks being equal to the difference between the inter-lens distance of a fixed lens stereoscopic camera and a predetermined fraction of the lineal distance represented by the numbers of said scale on which said largest numbers are closest to said reference marks.

4. In a shift bar of the type having a pair of members slidable in relation to each other one of which is adapted to be secured to a camera and the other to a stable support; a scale of pairs of graduations secured to one of said pair of members; a reference mark on the other of said pair of members; and pairs of numbers on said scale identifying pairs of graduations; said numbers having meaning solely in terms of lineal distance between a camera mounted on said shift bar and a subject to be photographed the distance between pairs of graduations bearing the same number being a predetermined fraction of the lineal distance represented by the number.

5. In a shift bar of the type having a pair of members slidable in relation to each other one of which is adapted to be secured to a camera and the other to a stable support; a scale of pairs of graduations secured to one of said pair of members; a reference mark on the other of said pair of members; and pairs of numbers on said scale identifying pairs of graduations; said numbers having meaning solely in terms of lineal distance between a camera mounted on said shift bar and a subject to be photographed; the distance between pairs of graduations bearing the same number being the difference between a predetermined fraction of the lineal distance represented by the number and the inter lens distance of a fixed lens stereoscopic camera; and the largest of said numbers being nearest to said reference mark of the shift bar when said scale is centered with respect to the reference mark.

References Cited in the file of this patent

UNITED STATES PATENTS

| 765,980 | Mercier | July 26, 1904 |
| 2,279,443 | Chanosky | Apr. 14, 1942 |
| 2,317,692 | Morin | Apr. 27, 1943 |
| 2,667,110 | Youtcheff | Jan. 26, 1954 |

FOREIGN PATENTS

| 317,767 | France | Jan. 14, 1902 |
| 324,005 | France | Aug. 25, 1902 |
| 392,407 | Great Britain | May 18, 1933 |